United States Patent
Chambliss et al.

(10) Patent No.: US 9,177,028 B2
(45) Date of Patent: Nov. 3, 2015

(54) DEDUPLICATING STORAGE WITH ENHANCED FREQUENT-BLOCK DETECTION

(75) Inventors: David D. Chambliss, Morgan Hill, CA (US); Mihail C. Constantinescu, San Jose, CA (US); Joseph S. Glider, Palo Alto, CA (US); Maohua Lu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 13/460,653

(22) Filed: Apr. 30, 2012

(65) Prior Publication Data

US 2013/0290277 A1 Oct. 31, 2013

(51) Int. Cl.
*G06F 17/30* (2006.01)

(52) U.S. Cl.
CPC ............... *G06F 17/30489* (2013.01)

(58) Field of Classification Search
CPC ........... G06F 17/30156; G06F 3/0608; G06F 3/0641; G06F 11/1453; G06F 12/0897; G06F 17/30097; G06F 17/3015; G06F 17/30153; G06F 17/30489; G06F 2212/7205; G06F 3/0611; G06F 3/0616
USPC ......... 707/691, 662, 663, 664, 666, 813, 814, 707/692
See application file for complete search history.

(56) References Cited

U.S. PATENT DOCUMENTS

| | | | |
|---|---|---|---|
| 7,962,452 B2 | 6/2011 | Anglin | |
| 7,979,403 B2 | 7/2011 | Kedem et al. | |
| 8,335,760 B1 | 12/2012 | Kumar et al. | |
| 8,392,384 B1* | 3/2013 | Wu et al. | 707/693 |
| 2003/0044076 A1 | 3/2003 | Mitchell et al. | |
| 2006/0277178 A1* | 12/2006 | Wang | 707/7 |
| 2008/0005141 A1* | 1/2008 | Zheng et al. | 707/101 |
| 2009/0100195 A1 | 4/2009 | Barsness et al. | |
| 2010/0037118 A1 | 2/2010 | Saliba et al. | |
| 2010/0082547 A1* | 4/2010 | Mace et al. | 707/648 |

(Continued)

FOREIGN PATENT DOCUMENTS

| CN | 101710323 A | 5/2010 |
|---|---|---|
| CN | 102024032 | 4/2011 |

(Continued)

OTHER PUBLICATIONS

Anonymous, "A method for reducing information leakage via cross-user deduplication mechanisms," Sep. 14, 2010, pp. 1-3, downloaded from ip.com, ip.com No. IPCOM000199656D, United States.

(Continued)

*Primary Examiner* — Dennis Truong
(74) *Attorney, Agent, or Firm* — Sherman IP LLP; Kenneth L. Sherman; Steven Laut (57) ABSTRACT

Detecting data duplication comprises maintaining a fingerprint directory including one or more entries, each entry including a data fingerprint and a data location for a data chunk. Each entry is associated with a seen-count attribute which is an indication of how often the fingerprint has been seen in arriving data chunks. Higher-frequency entries in the directory are retained, while also taking into account recency of data accesses. A data duplication detector detects that the data fingerprint for a new chunk is the same as the data fingerprint contained in an entry in the fingerprint directory.

20 Claims, 5 Drawing Sheets

(56) References Cited

U.S. PATENT DOCUMENTS

| | | | |
|---|---|---|---|
| 2010/0088296 A1 | 4/2010 | Periyagaram et al. | |
| 2010/0094817 A1* | 4/2010 | Ben-Shaul et al. | 707/697 |
| 2010/0250501 A1 | 9/2010 | Mandagere et al. | |
| 2010/0274772 A1* | 10/2010 | Samuels | 707/693 |
| 2011/0029497 A1 | 2/2011 | Benhase et al. | |
| 2011/0066666 A1 | 3/2011 | Takaoka et al. | |
| 2011/0078112 A1* | 3/2011 | Takata et al. | 707/622 |
| 2011/0093439 A1* | 4/2011 | Guo et al. | 707/679 |
| 2011/0218972 A1 | 9/2011 | Tofano | |
| 2011/0225191 A1* | 9/2011 | Xie | 707/775 |
| 2011/0238635 A1 | 9/2011 | Leppard | |
| 2011/0320690 A1* | 12/2011 | Petersen et al. | 711/103 |
| 2012/0030477 A1* | 2/2012 | Lu et al. | 713/189 |
| 2012/0158670 A1* | 6/2012 | Sharma et al. | 707/692 |
| 2012/0173656 A1* | 7/2012 | Sorenson, III | 709/217 |
| 2013/0086006 A1* | 4/2013 | Colgrove et al. | 707/692 |
| 2013/0097380 A1* | 4/2013 | Colgrove et al. | 711/118 |
| 2013/0275396 A1 | 10/2013 | Condict et al. | |
| 2013/0290276 A1 | 10/2013 | Chambliss et al. | |

FOREIGN PATENT DOCUMENTS

| | | |
|---|---|---|
| CN | 102156736 | 8/2011 |
| CN | 102378696 A | 3/2012 |

OTHER PUBLICATIONS

IBM, "Data DeDuplication Ratio based License Charge," Mar. 4, 2009, pp. 1-3, downloaded from ip.com, ip.com No. IPCOM000180085D, United States.

Zeng, Li-Fang et al., "Improving Data Locality and Reducing False-Sharing Based on Data Fusion," Jan. 2004, pp. 33-41, Chinese Journal of Computers, vol. 27, No. 1.,China, (English-language Abstract provided).

Patterson, H., et al., "SnapMirror®: File System Based Asynchronous Mirroring for Disaster Recovery," Jan. 28-30, 2002, pp. 117-129, Proceedings of the FAST 2002 Conference on File and Storage Technologies, USENIX Association, Berkeley, California, United States.

Wang, G., et al., "Research on a clustering data de-duplication mechanism based on Bloom Filter," Int'l Conf. on Multimedia Technology, Oct. 2010, pp. 1-5, IEEE, United States.

Wei, J., et al., "DBA: A Dynamic Bloom Filter Array for Scalable Membership Representation of Variable Large Data Sets," 19th IEEE International Symposium on MASCOTS, Jul. 2011, pp. 466-468, IEEE Computer Society, United States.

Wei, J., et al., "MAD2: A Scalable High-Throughput Exact Deduplication Approach for Network Backup Services," IEEE 26th Symp. on MSST, May 2010, pp. 1-14, IEEE, United States.

Zhou, Y., et al., "The Multi-queue Replacement Algorithm for Second Level Buffer Caches," In Proceedings of the USENIX Annual Technical Conference, Jun. 2001, pp. 91-104, USENIX Association, Boston, United States.

U.S. Non-Final Office Action for U.S. Appl. No. 13/460,611 mailed Sep. 9, 2014.

U.S. Final Office Action for U.S. Appl. No. 13/460,611 mailed Mar. 26, 2015.

U.S. Advisory Action for U.S. Appl. No. 13/460,611 mailed Jun. 4, 2015.

* cited by examiner

DEDUPLICATING STORAGE WITH ENHANCED FREQUENT-BLOCK DETECTION

BACKGROUND

The present invention relates generally to data reduction in storage systems, and more particularly to deduplicating storage with enhanced frequent-block detection.

Storage systems are utilized in information technology environments such as enterprise computing systems. Because information technology system managers are generally interested in increasing data storage efficiency, many modern storage systems provide data reduction for increasing storage efficiency and storage savings. Data reduction techniques are increasingly used to store primary data in less storage space. Efficiency in data reduction and retrieval is an important factor in storage system performance.

BRIEF SUMMARY

Embodiments of the present invention provide a deduplicating storage system with enhanced frequent-block detection. According to an embodiment of the invention, detecting data duplication comprises maintaining a fingerprint directory including one or more entries, each entry including a data fingerprint and a data location for a data chunk. Each entry is associated with a seen-count attribute which is an indication of how often the fingerprint has been seen in arriving data chunks. Higher-frequency entries in the directory are retained, while also taking into account recency of data accesses. A system for detecting data duplication detects that the data fingerprint for a new chunk is the same as the data fingerprint contained in an entry in the fingerprint directory.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Embodiments of the invention relate to deduplicating storage with enhanced frequent-block detection. Deduplication is a valuable feature for primary data storage because in some circumstances it can reduce the size and cost of a data storage system large enough to store a given body of data, by a sizable factor. Deduplication technology detects multiple instances of the same data in different places, stores the full data only once, and uses multiple references to that one location to record the multiple instances. When a host or application or user retrieves data from any of those multiple instances, the storage system follows the reference to address the one stored copy and return the data to the host. The suppression of duplicates is thus transparent to the layers that use the storage.

Effective deduplication depends on detecting the presence of duplicated data. The storage system maintains a directory that records what data content is stored at what locations. The content is represented in the directory by a fingerprint, which is a numeric value computed from the data via a hash function. The hash function is constructed so that it is extremely improbable that two units of data supplied to the storage system that are not themselves equal will ever have the same fingerprint value. The directory contains a map connecting data locations with the fingerprints of data stored there. It provides a mechanism to supply a fingerprint and determine whether that fingerprint is already known to the storage system, and if so to determine what location has the data with that fingerprint. This is used in the handling of newly written data to determine whether its content is new or is a duplicate, and if a duplicate, to store the reference to the existing location instead of storing the data.

For a primary storage system, it is essential that write operations have high performance, and therefore significant I/O operations are normally not required to perform lookups in the directory. Most directory lookup operations need to be serviced using only data in fast memory such as DRAM, of which there is a limited amount. In storage systems of normal size and cost subject to typical usage, the amount of DRAM is only large enough to retain a quite small fraction of all of the potential directory entries.

Thus, if the directory is purely in memory (so as to avoid disk I/O performance cost), a selection must be made of which entries to retain and which to discard in order to maximize benefit for the use of the limited memory resource. If disk or other storage slower than DRAM is used for part of the directory, it is nevertheless required that some amount of DRAM space be allocated for each retained directory entry so that the on-disk data can be located without excessive I/O. For this reason it is still necessary to select some entries for retention and others for discard.

The procedure for selecting which entries to insert, retain, and discard has an important impact on the success of a deduplication system in achieving its goal of reducing storage system cost. An embodiment of the invention provides a deduplicating storage system with enhanced frequent-block detection, which addresses selecting which directory entries to insert, retain, and discard. Said directory entries record what data content is stored at what locations in the storage system.

According to an embodiment of the invention, the deduplicating storage system increases the likelihood that repeated blocks of data will still be in the active portion of the directory when a repeat instance is received. As a result the deduplicating storage system creates a higher rate of deduplication and a lower cost for a storage system that stores a given body of data.

Existing strategies to select which data to retain include retain-all, FIFO, LRU, and batched LRU. The retain-all strategy never discards entries, but expands the directory size indefinitely as more data is written. This has a severe disadvantage: the amount of disk I/O overhead for lookups increases progressively as the system fills and performance becomes unacceptable. The FIFO strategy retains a fixed number of directory entries, when necessary discarding the longest-resident ones. The LRU strategy discards those that have the longest time since either insertion or a use for a found duplicate. Batched LRU is similar to LRU except that a group of entries created close together in time are discarded as a group, selecting the group with the longest time since any member was either inserted or a used for a found duplicate. These recency-based strategies have the disadvantage that a rush of new data can readily flush out entries that are likely to have matches in the medium term.

Recency-based strategies are often associated with caches that track dynamic I/O workloads, and they attempt to predict which data will be accessed based on the recent access pattern. However, predicting which data is most likely to be a duplicate of existing data in the system is a function of other parameters, for example how many duplicates of a given piece of data already exist in the system. That is, evidence of past duplication is a good predictor for future duplication.

An embodiment of the invention applies a frequency-sensitive strategy for retaining directory elements. The invention incorporates an awareness of how many times a given entry has been used for a found duplicate, into the strategy for retaining and discarding directory entries. A used entry (i.e., one which was used to find a duplicate and reduce storage consumption) has a longer retention period than an unused entry (which was created when data with its signature was written for the first time, but which had no subsequent uses). Specifically, if an entry A is used at about the time an entry B is first inserted, and B is discarded without being used, then A is not discarded until a substantial time later than when B is discarded. Furthermore, entries with more uses are generally retained longer than entries with only one use. Thus, for example, an entry that has been used five times will be retained substantially longer after its last use than an entry that has been used only once.

As such, according to an embodiment of the invention, content which is known from history to be repeatedly re-used will be retained even if a stream of unrelated content is injected between uses. Sizeable repeated blocks are often embedded in collections of non-repeated data which are long enough to cause the repeated content to be flushed out for typical directory sizes when using recency-based policies for entry eviction. An embodiment of the invention extends the period during which a fingerprint will be remembered in the system, by using a probabilistic shadow list to remember the critical information about the fingerprint so that if it is looked up again there will be a minimum of lost opportunities for deduplication.

Figure 1:
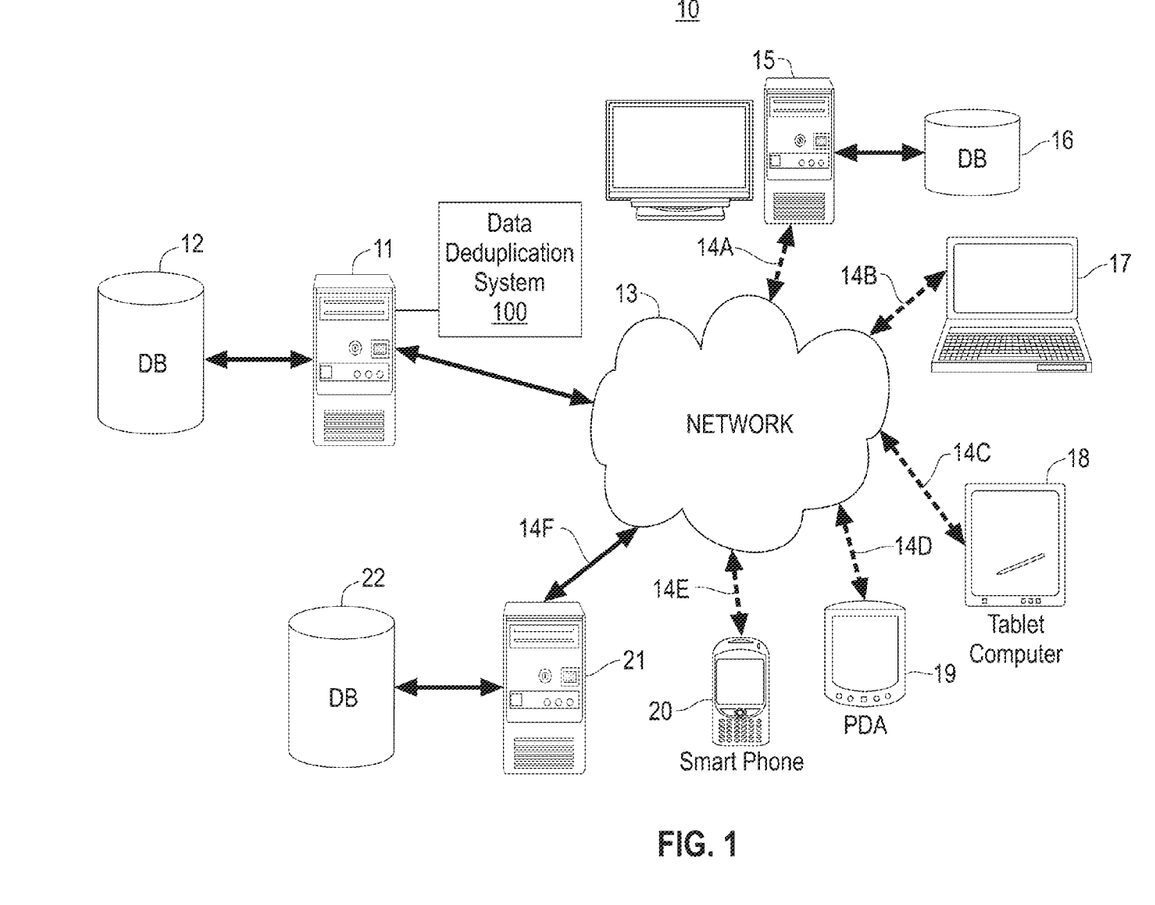
FIG. 1 is a block diagram illustrating an example of a network environment for data deduplication in a storage system, according to an embodiment of the present invention.

Referring now to the drawings, FIG. 1 illustrates an example of the basic components of an information technology system 10 utilizing a data deduplication system 100, used in connection with a preferred embodiment of the present invention. The system 10 includes a server 11 and the remote devices 15 and 17-20 that may utilize the data deduplication system 100 of the present invention.

Figure 2:
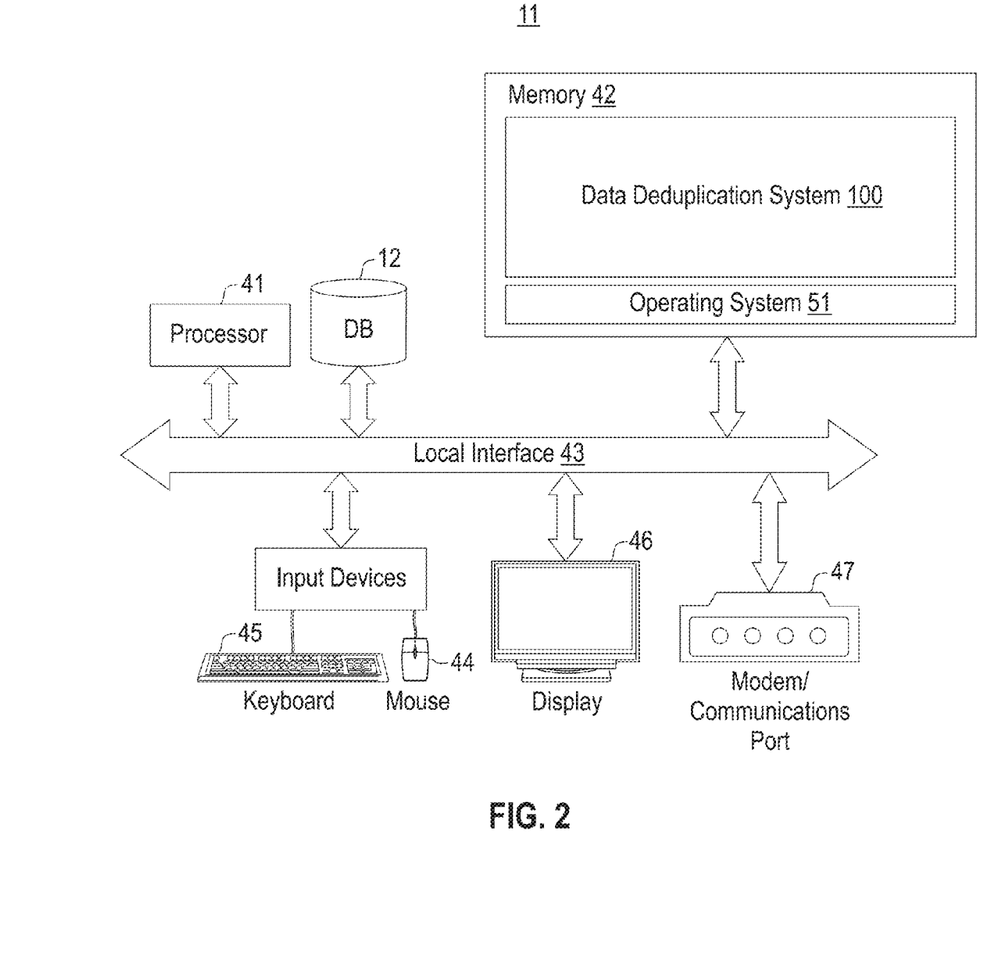
FIG. 2 is a block diagram illustrating an example of a server utilizing a data deduplication process, according to an embodiment of the present invention, as shown in FIG. 1.

Illustrated in FIG. 2 is a block diagram demonstrating an example of the server 11, as shown in FIG. 1, utilizing an embodiment the data deduplication system 100 according to an embodiment of the present invention. The data deduplication system 100 utilizes a data deduplication process for data reduction in a file system, according to an embodiment of the invention. In another embodiment, the data deduplication system 100 may be implemented as a standalone system as shown in FIG. 1.

In one embodiment, the data deduplication system 100 is useful with current storage platforms, and will lower the cost per terabyte of many configurations by allowing configurations that have more storage (e.g., disks) attached to a controller subsystem of the storage system.

Figure 3:
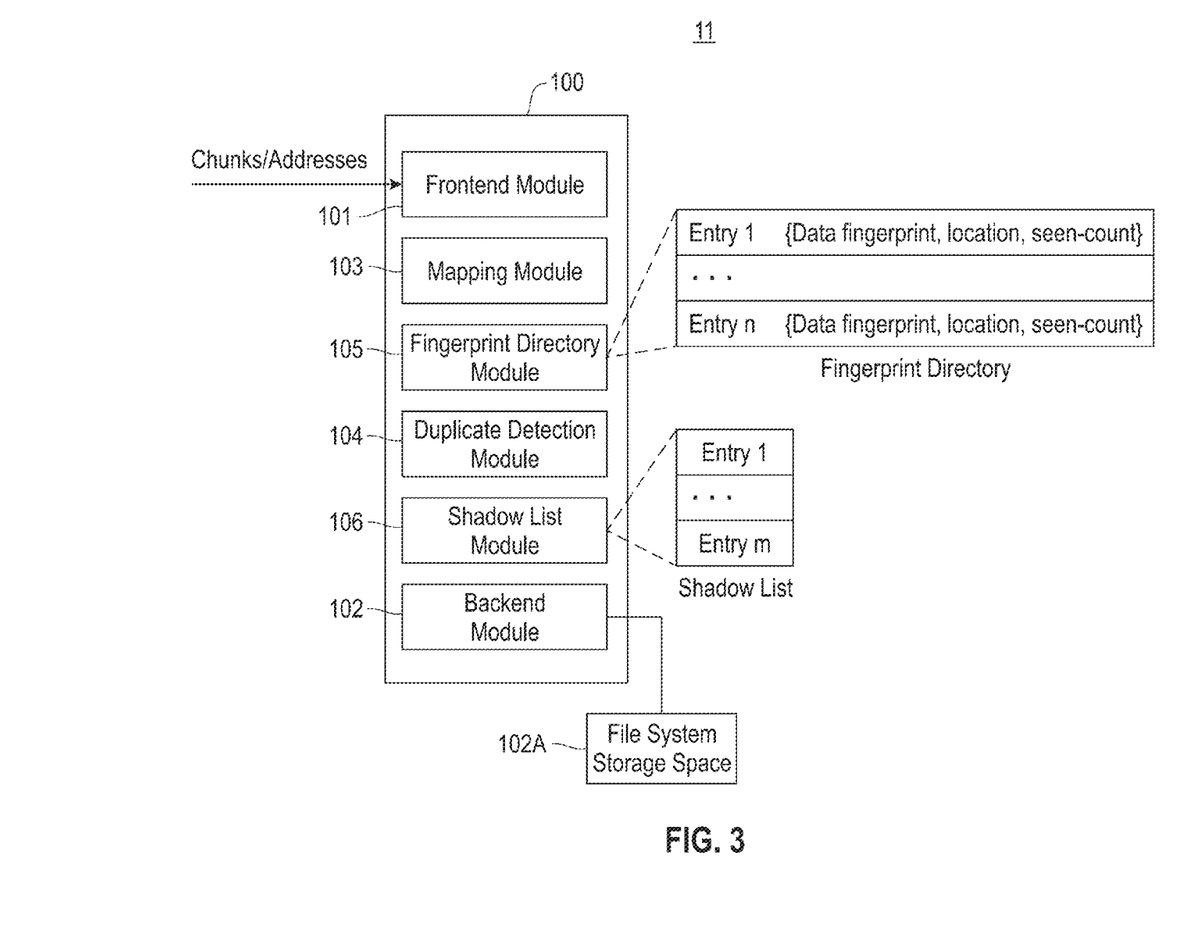
FIG. 3 shows a block diagram of components of storage system implementing data deduplication, according to an embodiment of the invention.

Referring to FIG. 3, in one implementation, the storage system 11 includes said data deduplication system 100, and further comprises a frontend module 101 at which data chunks to be written are received, along with the logical addresses to which the data are to be written. The storage system 11 further comprises a backend module 102 by which data chunks are written to storage locations 102A, wherein said writes involve the consumption of physical storage space.

The storage system 11 further comprises mapping controller module 103 that records the correspondence between logical addresses and storage locations. The mapping is changed on writes and consulted for reads.

The storage system 11 further includes a duplicate detector 104, a fingerprint controller module including a fingerprint directory 105, and a shadow list controller module including a shadow list 106. The fingerprint directory 105 comprises a mapping service from signatures to storage locations. Each entry in the directory 105 contains a fingerprint and a storage location for a data chunk. Each entry is also associated with a seen-count attribute which generally is an indication of how often the fingerprint has been seen in the arriving data chunks.

In one embodiment, of the invention, the seen-count attribute provides a mechanism to distinguish a multiply-seen entry, whose data fingerprint is believed to have been present for at least two chunks, from a once-seen entity, for which the chunks processed so far are believed to contain the data fingerprint once but not more. The seen-count attribute may also enable higher and lower multiple counts to be distinguished, for example distinguishing a fingerprint probably seen at least five times from one that was probably seen only two or three times. The terms "believed" and "probably" are used because the seen-count attribute need not be an exact indication. The fingerprint directory 105 is maintained with use of the seen-count attribute so as to preferentially retain higher-frequency entries, while also taking into account the recency of accesses.

In one embodiment of the invention, the shadow list 106 provides a record of fingerprint values that have been removed from the fingerprint directory 105 in the past or might be added to the fingerprint directory 105 in the future. In one embodiment, some values in the shadow list 106 are not in the fingerprint directory 105 (it is not required that none of the values in the shadow list are in the fingerprint directory).

The shadow list 106 consumes much less space per fingerprint value than the fingerprint directory 105, because the shadow list 106 does not retain storage locations and does not provide accuracy guarantees. The purpose of the shadow list 106 is to remember much longer those values of fingerprint that have been seen, so as to recognize and retain a larger fraction of those which are repeated multiple times. When a fingerprint is retrieved from the shadow list 106, it means the fingerprint has been seen at least twice (except for false positives) and the entry that results is given a chance to establish a stable presence in the fingerprint directory 105.

In one embodiment of the invention, the shadow list 106 comprises a probabilistic set-object data structure. That is, the shadow list 106 is an allocation of computer system resources with associated methods to insert a fingerprint and to look up a fingerprint. The shadow list 106 may also include a method to delete a fingerprint. The result of a lookup in the shadow list 106 is a positive or negative answer. A negative answer means that either the fingerprint in question was never inserted in the shadow list 106, or it was deleted after it was last inserted, or it was evicted after it was last inserted. A positive answer means that either the fingerprint in question was inserted and was neither deleted nor evicted after it was last inserted in the shadow list 106, or this is an instance of an inaccurate positive answer, also called a false positive. The expected rate of false positive results is set to be small and is incorporated into the design (an example value might be 0.1% which is one false positive result in 1000 lookups).

The construction of the shadow list 106 according to an embodiment of the invention is fundamentally different from that of a history buffer in page-cache algorithms. For a page-cache problem, an entry can be made much smaller by omitting the data page, and it is straightforward to keep a deep history in comparatively small space. According to the present invention, however, an entry in the fingerprint directory 105 is not much larger than the fingerprint itself. The introduction of a probabilistic shadow list 106 is a key to achieving the benefits of the invention.

Figure 4:
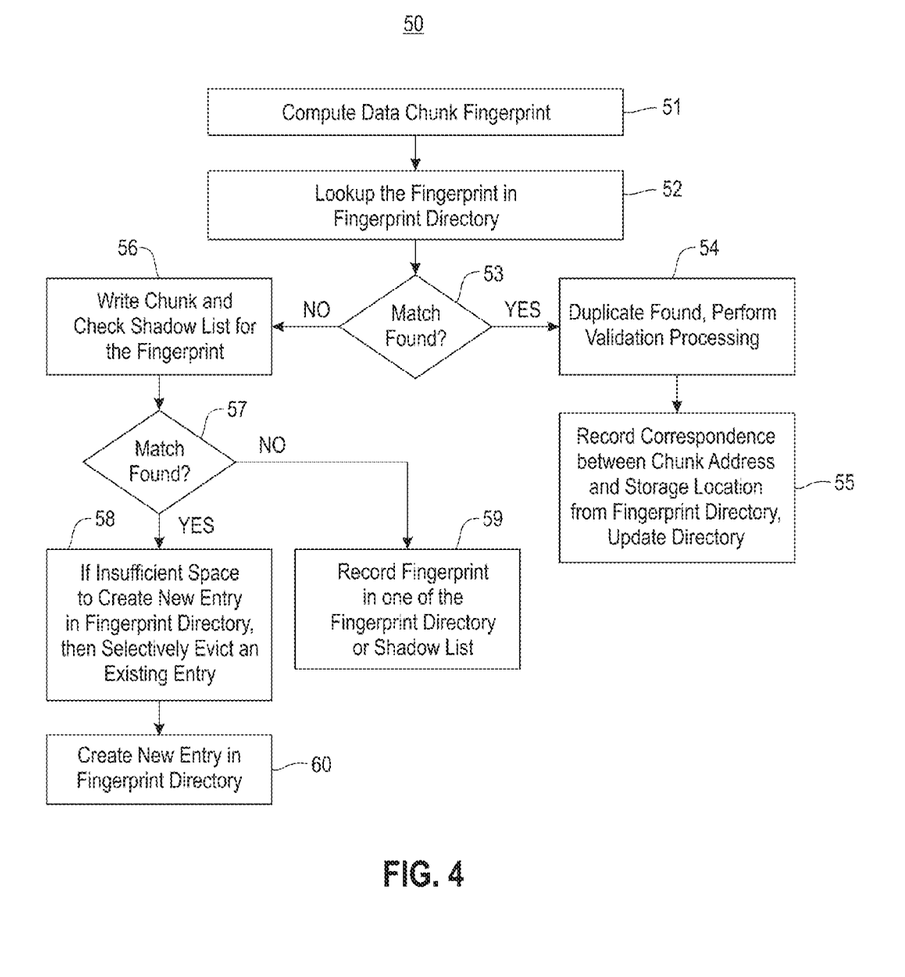
FIG. 4 shows a flowchart illustrating a data deduplication process, according to an embodiment of the present invention.

FIG. 4 shows a deduplication process 50 for a deduplicating storage with enhanced frequent-block detection, according to an embodiment of the invention. According to process block 51, when a data chunk to be written is received, the duplicate detector 104 computes the fingerprint from the received data. According to process block 52, the duplicate detector 104 conducts a lookup operation in the fingerprint directory 105, using the computed fingerprint as a key.

According to process block 53, if a matching entry is found in the fingerprint directory 105, then the result is called a found duplicate. According to process block 54, the mapping module 103 is notified that the content associated with the logical address of the received write corresponds to the storage location reported by the fingerprint directory 105. In one embodiment, the mapping controller performs validation processing to ensure that the found duplicate is valid, and if validation fails the process then proceeds as if the duplicate was not found. The need for validation can arise, for example, because of concurrent operations. Upon successful validation, in process block 55 the mapping module 103 records the correspondence for use in future I/Os. Also, the fingerprint directory 105 is updated to increment the seen-count attribute of the directory entry that was found. This may be achieved by changing a bitfield belonging to the entry, or by moving the entry to another region of the directory. The process is finished handling the newly written chunk, and may await arrival of another data chunk to be written. When such a new chunk arrives, the process may proceed again to process block 51.

If in process block 53, no matching entry was found in the fingerprint directory 105, then according to process block 56 the chunk is written by the backend module 102, and the shadow list 106 is examined to look for the data fingerprint. In process block 57, if the result of the lookup in the shadow list 106 is positive, then that is interpreted as indicating that the fingerprint was received by the storage system in a previous chunk, although the storage location for that previous chunk is not available in the directory 105.

A bounded amount of space is allotted to the fingerprint directory 105. If an entry insertion is called for but there is insufficient space, then in process block 58 a depopulation process involves evicting an entry already present is evicted from the directory 105. The selection of which entry to evict treats differently those entries which are once-seen and those multiply-seen. Generally, those entries which have been found more times are retained longer. Different embodiments will choose two or more categories of seen-count for distinct treatment. Within a seen-count category, eviction generally adheres to an LRU system, though in an approximate form to keep memory requirements from being excessive.

In process block 60 a new entry is created in the fingerprint directory 105 containing the fingerprint and the storage location and with a twice-seen value of the seen-count attribute, and in a preferred embodiment the shadow list 106 is modified to delete the fingerprint. The process is finished handling the newly written chunk, and may await arrival of another data chunk to be written. When such a new chunk arrives, the process may proceed again to process block 51.

If the result of the lookup in the shadow list 106 is false, then in process block 59 the fingerprint is recorded in one of the data structures 105 or 106 so that if the same fingerprint arrives later, there is a chance of detecting that the second arrival is a repeat of the first. In one embodiment, the fingerprint is entered into the shadow list 106 at this point. In another embodiment, an entry is created in the fingerprint directory 105 at this point, containing the fingerprint and the storage location and with a once-seen value of the seen-count attribute. In another embodiment both actions are taken. The preferable selection of action depends on the statistical character of duplicate references to the same fingerprint. Creating an entry in the fingerprint directory 105 at this point introduces a weight to recency in the entry creation, whereas adding it to the shadow list 106 places greater weight on frequency.

Many different policies are possible for distinguishing the seen-count categories. One strategy is to track the age, in time units or in total I/Os performed by the storage system, of the entries or entry groups in the categories, and to maintain fixed ratio of age-at-eviction between categories. For example, with a ratio of 50, at a time when 4-hour-old entries are being evicted from the never-found category, the found-once category would be evicting those entries last found at least 200 hours ago. The absolute age-at-eviction numbers would depend on memory available and on the rate of required evictions. In that scheme, the memory allotted to the different categories would vary as needed to maintain the ratio. Further, a fixed ratio of entry counts may be maintained, or a combined age-ratio-and-memory-bounds scheme created. In one embodiment, when a once-seen entry is evicted from the directory 105, the fingerprint the entry contains is added to the shadow list 106.

In one embodiment, fingerprints in the shadow list 106 can be associated with age groups, and the selection of entries for eviction can take into account the age groups. The shadow list 106 also generally has a fixed size, so it is necessary at times to perform depopulation (i.e., to remove some fingerprints to make room for more fingerprints to be added).

In one embodiment, the depopulation process comprises evicting specific entries from the shadow list 106. Evictions may be age-based, random, or age-biased-random. Exact age-based (i.e., FIFO) eviction would require a large space to record the insertion order and is probably best avoided. In one embodiment, the depopulation action is not specific to individual fingerprints but nevertheless has the result of reducing the number of fingerprint values for which a positive result would be returned. For example, in a structure such as a Bloom filter, depopulation may comprise clearing certain bits, but the specific values thus deleted are not readily identified.

In one embodiment, when a multiply-seen entry is evicted from the fingerprint directory 105, that entry is regarded as having had its shot at stability in the upper tiers and having not achieved it, is simply discarded. In another embodiment, the fingerprint is added to the shadow list (shadow directory) 106.

In a preferred embodiment, the shadow list 106 comprises a set-object data structure on a collapsed key. This is a data structure that corresponds to a mathematical set whose elements are binary numbers may be represented with a specified number of bits. The data structure provides methods for insertion, deletion, and lookup of these elements. The values used by the shadow list controller 106 as elements of the set are collapsed keys derived from the data fingerprints. The collapsed key comprises a value in a smaller namespace than the fingerprint itself. For example, the fingerprint can comprise a 256-bit number computed with a hash function, and the collapsed key may comprise a 37-bit number extracted by selecting specific bits from the longer number. The occupancy limit might be 0.1%, meaning that when that occupancy is reached, each insertion must be matched with an eviction.

In one embodiment, the fingerprint controller 105 retains higher-frequency entries, while also taking into account recency of data accesses. The duplicate detector module 104 is configured to detect when the data fingerprint for a new chunk is the same as the data fingerprint contained in an entry in the fingerprint directory.

In one embodiment, the fingerprint directory comprises a multiply-seen entry which has been found, and a once-seen entry which is inserted more recently, and the fingerprint controller discards the once-seen entry substantially sooner than the multiply-seen entry. The seen-count attribute provides the distinction between a multiply-seen entry and a once-seen entry. The fingerprint controller 105 discards the once-seen entry substantially sooner than the multiply-seen entry.

In one embodiment, the shadow list controller 106 is configured to perform functions including: detecting when the data fingerprint for a new chunk is contained in the shadow list, removing the data fingerprint for said new chunk from the shadow list, and adding to the fingerprint directory an entry containing the data fingerprint and the data location of the new chunk.

In one embodiment, the shadow list controller 106 also adds to the shadow list the data fingerprint for a new chunk whose data fingerprint was not found in the fingerprint directory by the duplicate detector 104. In one embodiment, the fingerprint controller 105 discards a once-seen entry from the fingerprint directory and adds to the shadow list the data fingerprint from the discarded entry. In one embodiment, the shadow list controller 106 also adds to the shadow list the data fingerprint for a new chunk whose data fingerprint was not found in the fingerprint directory by the duplicate detector 104, and the fingerprint controller 105 discards a once-seen entry from the fingerprint directory and adds to the shadow list the data fingerprint from the discarded entry.

As an example, according to an embodiment of the invention, a storage node that has 1024 MB available for duplicate detection is considered. It is estimated that the fingerprint directory will require 50 bytes per entry, including any indexing structures, based on a 32-byte fingerprint. For example 768 MB may be allocated to the fingerprint directory, accommodating more than 15 million entries. The remaining 256 MB are allocated to the shadow list. For the shadow list, with a budget of 2 bytes per entry, a false-positive rate better than about 0.1% can be achieved. One approach includes mapping fingerprint values into collapsed keys of smaller size, for example by extracting 37 bits (a number which is changeable but which fits this analysis) from fixed places in the fingerprint, and then to implement a precise set-object data structure for the possible values of collapsed keys. This approach yields a positive result for any probe value whose collapsed key is in the set. When probe values are generated by hash computations from real data streams containing duplicate chunks, the positive result is generally a true positive that results because the probe fingerprint had been previously inserted in the shadow list 106. When probe values are generated randomly it is exceedingly unlikely that the same value had previously been selected at random and inserted. For said random probe, a positive result is most likely to be a false positive. The false-positive rate corresponds to the occupancy rate (alpha) in the set: If the occupancy rate is 0.5, meaning that 50% of all possible values were inserted, then a random probe hash has a 50% chance of matching an inserted collapsed key. The goal is for 0.1% for both values.

The information-theoretical floor on the number of bits required to represent such a set object is log [base 2] (1/alpha) as the number of bits per entry, where alpha represents the occupancy rate. In this example alpha is 0.001 (0.1%) and the minimum size per entry is 10 bits out of a budget of 16 per entry. The additional 6 bits allow room for a more computationally feasible implementation.

Figure 5:
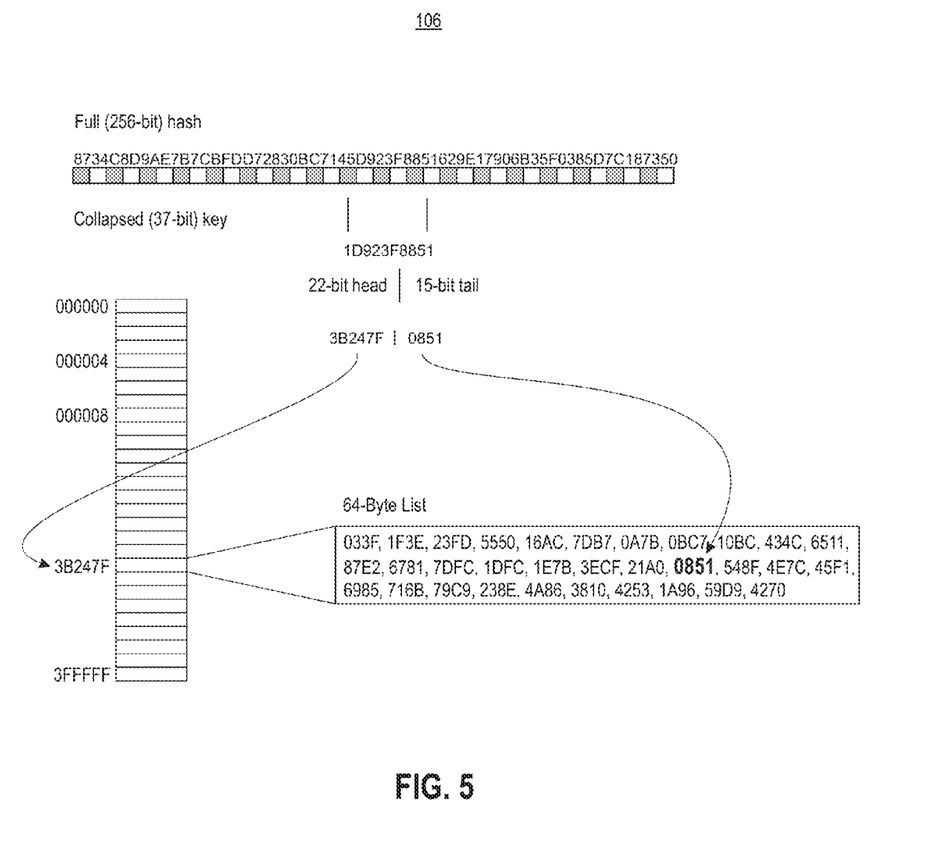
FIG. 5 shows an example shadow list structure for a data deduplication system, according to an embodiment of the invention.

FIG. 5 shows an example implementation of the shadow list 106 (values illustrated in hexadecimal digits), according to an embodiment of the invention. In the example shown, the shadow list allocates 256 MB of memory into 4 million segments of 64 bytes each. A 256-bit hash is shown, and 37 bits are extracted as the collapsed key. Of these 37 bit positions, 22 bits are selected as the head of the collapsed key, and the remaining 15 bits are the tail. The 256 MB space is divided into about 4 million segments of 64 bytes each, and the 22-bit head of the collapsed key selects the segment. Inside the segment is stored a list of tails. A simple way to store the list is to divide the segment into 32 cells of two bytes (16 bits) each. Each cell can contain one tail in its low-order 15 bits, and the high-order bit indicates whether the cell contains a tail or not. A lookup reads and tests each cell; an insertion shifts the values and appends the inserted value. There are 32,768 possible values for the 15-bit tail. A population of 32 entries out of a possible 32,768 structurally enforces a 0.1% occupancy limit. Other variations could use a more efficient coding within each line so that each could use less memory. Another possible structure of the shadow list 106 is a Bloom filter, or a combination of Bloom filters.

There can also be a variation in which the shadow list 106 grows large and is output to disk. Then, it is not consulted in line as described above. Instead, a background process reads the shadow list 106 and looks for repeats within it. This may be performed with limited memory by handling different namespace partitions separately. Embodiments of the invention provide said shadow list and discarding a once-seen entry from the fingerprint directory substantially sooner than a multiply-seen entry.

In the system 10 of FIG. 1, each of the remote devices 15 and 17-20 has applications and can have a local database 16. Server 11 may implement applications, and a database 12 may be accessed by remote device 15 and 17-20 via connections 14(A-F), respectively, over network 13. In one implementation, the server 11 executes software for a computer network and controls access to itself and database 12.

The remote device 15 and 17-20 may access the database 12 over a network 13, such as but not limited to: the Internet, a local area network (LAN), a wide area network (WAN), via a telephone line using a modem (POTS), Bluetooth, WiFi, WiMAX, cellular, optical, satellite, radio frequency (RF), Ethernet, magnetic induction, coax, RS-485, the like or other like networks. The server 11 may also be connected to the LAN within an organization.

The remote device 15 and 17-20 may each be located at remote sites. Remote device 15 and 17-20 include but are not limited to, PCs, workstations, laptops, handheld computers, pocket PCs, PDAs, pagers, wireless application protocol (WAP) devices, non-WAP devices, cell phones, palm devices, printing devices and the like. When a user at one of the remote devices 15 and 17-20 desires to access data from the database 12 at the server 11, the remote device 15 and 17-20 communicates over the network 13, to access the server 11 and database 12.

Third party computer systems 21 and databases 22 can access the server 11 (FIG. 2). Data that is obtained from third party computer systems 21 and database 22 can be stored on server 11 and database 12 in order to provide later access to a user on remote devices 15 and 17-20. It is also contemplated that for certain types of data that the remote devices 15 and 17-20 can access the third party computer systems 21 and database 22 directly using the network 13.

In one embodiment the server 11 comprises a storage system. Generally, in terms of hardware architecture, as shown in FIG. 2, the server 11 includes a processor 41, a computer readable medium such as memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the server 11, and a semiconductor based microprocessor (in the form of a microchip) or a microprocessor.

The memory 42 can include any one or combination of volatile memory elements (e.g., random access memory (RAM), such as dynamic random access memory (DRAM), static random access memory (SRAM), etc.) and nonvolatile memory elements (e.g., read only memory (ROM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 2, the software in the memory 42 includes a suitable operating system (O/S) 51 and the data deduplication system 100 of the present invention. The data deduplication system 100 comprises functional components and process blocks described herein.

The operating system 51 essentially controls the execution of other computer programs, such as the data deduplication system 100, and provides scheduling, input/output control, file and data management, memory management, and communication control and related services. However, the data deduplication system 100 of the present invention is applicable on all other commercially available operating systems.

The data deduplication system 100 may comprise a source program, executable program (object code), script, or any other entity comprising a set of computer program instructions to be performed. When the data deduplication system 100 is a source program, then the program is usually translated via a compiler, assembler, interpreter, or the like, which may or may not be included within the memory 42, so as to operate properly in connection with the O/S 51. Furthermore, the data deduplication system 100 can be written as (a) an object oriented programming language, which has classes of data and methods, or (b) a procedure programming language, which has routines, subroutines, and/or functions. The computer program instructions may execute entirely on server 11, partly on the server 11, as a stand-alone software package, partly on server 11 and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a network interface card (NIC) or modulator/demodulator 47 (for accessing remote devices, other files, devices, systems, or a network), a RF or other transceiver (not shown), a telephonic interface (not shown), a bridge (not shown), a router (not shown), etc.

If the server 11 is a PC, workstation, server, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM, EEPROM or the like, so that the BIOS can be executed when the server 11 is activated.

When the server 11 is in operation, the processor 41 is configured to execute software stored within the memory 42, to communicate data to and from the memory 42, and generally to control operations of the server 11 pursuant to the software. The data deduplication system 100 and the O/S 51 are read, in whole or in part, by the processor 41, perhaps buffered within the processor 41, and then executed.

When the data deduplication system 100 is implemented in software, as is shown in FIG. 2, it should be noted that the data deduplication system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a RAM (electronic), a ROM (electronic), an EPROM, EEPROM, or Flash memory (electronic), an optical fiber (optical), and a CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

In an alternative embodiment, where the data deduplication system 100 is implemented in hardware, the adaptive data reduction system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The remote devices 15 and 17-20 provide access to the data deduplication system 100 of the present invention on server 11 and database 12 using for example, but not limited to an Internet browser. The information accessed in server 11 and database 12 can be provided in a number of different forms including but not limited to ASCII data, WEB page data (i.e., HTML), XML or other type of formatted data.

As illustrated, the remote device 15 and 17-20 are similar to the description of the components for server 11 described with regard to FIG. 2. The remote devices 15 and 17-20 may be referred to as remote devices 15 for the sake of brevity.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method for detecting data duplication, comprising:
maintaining a fingerprint directory comprising one or more entries, each entry including a data fingerprint and a data location for a data chunk;
associating each said entry with a seen-count attribute which is an indication of how often a data fingerprint has been seen in arriving data chunks to be written in a storage system, and distinguishes multiply-seen entries for data fingerprints present in at least two data chunks from once-seen entries for data fingerprints present in no more than a single data chunk;
retaining higher-frequency entries, while also taking into account recency of data accesses for the higher-frequency entries based on the seen-count attribute and the data access age; and
detecting that the data fingerprint for a new chunk is the same as the data fingerprint contained in an entry in the fingerprint directory,
wherein a policy is applied for distinguishing multiple seen-count categories based on tracking data access ages of entries in the fingerprint directory for different seen-count categories.

2. The method of claim 1, wherein:
the fingerprint directory comprises a multiply-seen entry which has been found, and a once-seen entry which is inserted more recently, and the fingerprint module discards the once-seen entry substantially sooner than the multiply-seen entry;
the seen-count attribute provides the distinction between a multiply-seen entry and a once-seen entry; and
the data access ages of entries in the fingerprint directory are tracked for distinguishing the multiple seen-count categories based on a fixed ratio of age-at-eviction between multiple seen-count categories.

3. The method of claim 2, further comprising:
maintaining a probabilistic shadow list comprising a record of fingerprint values not contained in the fingerprint directory;
maintaining a shadow list module including the shadow list;
detecting that the data fingerprint for a new chunk is contained in the shadow list;
removing the data fingerprint for said new chunk from the shadow list; and
adding to the fingerprint directory an entry containing the data fingerprint and the data location of the new chunk.

4. The method of claim 3, further comprising:
adding to the shadow list the data fingerprint for a new chunk whose data fingerprint was not found in the fingerprint directory by the duplicate detection module.

5. The method of claim 3, further comprising:
discarding a once-seen entry from the fingerprint directory and adding to the shadow list the data fingerprint from the discarded entry.

6. The method of claim 3, wherein:
the shadow list further comprises a probabilistic set-object data structure with a bounded error rate.

7. The method of claim 6, wherein:
the probabilistic set-object data structure comprises one of a set-object data structure on a collapsed key and a Bloom filter.

8. The method of claim 6, wherein the data access ages of the entries in the fingerprint directory are tracked in one of time units and total input/output operations performed by the storage system.

9. A computer program product for detecting data duplication, the computer program product comprising:
a non-transitory tangible storage medium readable by a computer system and storing instructions for execution by the computer system for performing a method comprising:
maintaining a fingerprint directory comprising one or more entries, each entry including a data fingerprint and a data location for a data chunk;
associating each said entry with a seen-count attribute which is an indication of how often the data fingerprint has been seen in arriving data chunks to be written in a storage system and is used for distinguishing multiply-seen entries for data fingerprints present in at least two data chunks from once-seen entries for data fingerprints present in no more than a single data chunk;
retaining higher-frequency entries, while also taking into account recency of data accesses for the higher-frequency entries based on the seen-count attribute and data access age; and
detecting that the data fingerprint for a new chunk is the same as the data fingerprint contained in an entry in the fingerprint directory,
wherein a policy is applied for distinguishing multiple seen-count categories based on tracking data access ages of entries in the fingerprint directory for different seen-count categories.

10. The computer program product of claim 9, wherein:
the fingerprint directory comprises a multiply-seen entry which has been found, and a once-seen entry which is inserted more recently, and the fingerprint module discards the once-seen entry substantially sooner than the multiply-seen entry; and
the seen-count attribute provides the distinction between a multiply-seen entry and a once-seen entry.

11. The computer program product of claim 10, further comprising:
- maintaining a probabilistic shadow list comprising a record of fingerprint values not contained in the fingerprint directory;
- maintaining a shadow list module including the shadow list;
- detecting that the data fingerprint for a new chunk is contained in the shadow list;
- removing the data fingerprint for said new chunk from the shadow list; and
- adding to the fingerprint directory an entry containing the data fingerprint and the data location of the new chunk.

12. The computer program product of claim 11, wherein:
- the shadow list further comprises a probabilistic set-object data structure; and
- the data access ages of entries in the fingerprint directory are tracked for distinguishing multiple seen-count categories based on a fixed ratio of age-at-eviction between multiple seen-count categories.

13. A system for detecting data duplication, comprising:
- a memory device;
- a fingerprint controller coupled to the memory device, the fingerprint controller maintains a fingerprint directory comprising one or more entries, each entry including a data fingerprint and a data location for a data chunk in a storage device;
- wherein each entry is associated with a seen-count attribute which is an indication of how often the fingerprint has been seen in arriving data chunks to be written in the system, and distinguishes multiply-seen entries for data fingerprints present in at least two data chunks from once-seen entries for data fingerprints present in no more than a single data chunk, and wherein the fingerprint controller retains higher-frequency entries, while also taking into account recency of data accesses for the higher-frequency entries based on the seen-count attribute and data access age; and
- a duplicate detector that detects if the data fingerprint for a new chunk is the same as the data fingerprint contained in an entry in the fingerprint directory,
- wherein a policy is applied for distinguishing multiple seen-count categories based on tracking data access ages of entries in the fingerprint directory for different seen-count categories.

14. The system of claim 13, wherein:
- the fingerprint directory comprises a multiply-seen entry which has been found, and a once-seen entry which is inserted more recently, and the fingerprint controller discards the once-seen entry substantially sooner than the multiply-seen entry; and
- the seen-count attribute provides the distinction between a multiply-seen entry and a once-seen entry.

15. The system of claim 14, further comprising:
- a shadow list controller coupled to the memory device, the shadow list controller maintains a probabilistic shadow list comprising a record of fingerprint values not contained in the fingerprint directory, wherein the shadow list controller detects that the data fingerprint for a new chunk is contained in the shadow list, removes the data fingerprint for said new chunk from the shadow list, and adds to the fingerprint directory an entry containing the data fingerprint and the data location of the new chunk.

16. The system of claim 15, wherein:
- the shadow list controller adds to the shadow list the data fingerprint for a new chunk whose data fingerprint was not found in the fingerprint directory by the duplicate detector.

17. The system of claim 15, wherein:
- the fingerprint controller discards a once-seen entry from the fingerprint directory and adds to the shadow list the data fingerprint from the discarded entry.

18. The system of claim 15, wherein:
- the shadow list further comprises a probabilistic set-object data structure with a bounded error rate; and
- the data access ages of entries in the fingerprint directory are tracked for distinguishing the multiple seen-count categories based on a fixed ratio of age-at-eviction between multiple seen-count categories.

19. The system of claim 18, wherein the probabilistic set-object data structure comprises one of a set-object data structure on a collapsed key and a Bloom filter.

20. The system of claim 18, wherein the data access ages of the entries in the fingerprint directory are tracked in one of time units and total input/output operations performed by the system.

* * * * *